(12) United States Patent
Granström

(10) Patent No.: US 9,336,210 B2
(45) Date of Patent: May 10, 2016

(54) DETERMINING A LIKELIHOOD AND DEGREE OF DERIVATION AMONG MEDIA CONTENT ITEMS

(71) Applicant: Google Inc., Mountain View, CA (US)

(72) Inventor: Johan Georg Granström, Zurich (CH)

(73) Assignee: GOOGLE INC., Mountain View, CA (US)

( * ) Notice: Subject to any disclaimer, the term of this patent is extended or adjusted under 35 U.S.C. 154(b) by 270 days.

(21) Appl. No.: 13/942,638

(22) Filed: Jul. 15, 2013

(65) Prior Publication Data

US 2015/0019578 A1     Jan. 15, 2015

(51) Int. Cl.
*G06F 7/00* (2006.01)
*G06F 17/30* (2006.01)
*G06Q 50/18* (2012.01)

(52) U.S. Cl.
CPC .... *G06F 17/30023* (2013.01); *G06F 17/30964* (2013.01); *G06Q 50/184* (2013.01)

(58) Field of Classification Search
CPC ................................................. G06F 17/30023
USPC ............ 707/E17.009; 715/716; 709/217, 219
See application file for complete search history.

(56) References Cited

U.S. PATENT DOCUMENTS

2012/0022975 A1 *    1/2012   L'Heureux et al. .......... 705/27.1

FOREIGN PATENT DOCUMENTS

| EP | 1515241 | 3/2005 |
|---|---|---|
| EP | 1515241 A2 * | 3/2005 |
| WO | 2009073895 | 6/2009 |
| WO | WO 2009073895 A1 * | 6/2009 |

* cited by examiner

*Primary Examiner* — Ajith Jacob
(74) *Attorney, Agent, or Firm* — Lowenstein Sandler LLP

(57) ABSTRACT

Systems and methods are described for determining a likelihood and degree of derivation among media content items. In one example, a processing device processes a first media content item in relation to one or more other media content items to identify one or more similarities between the first media content item and one or more other media content items. The processing device determines, based on an identification of the one or more similarities between the first media content item and one or more other media content items, one or more derivation metrics with respect to the first media content item and one or more other media content items. The processing device initiates, based on a determination of the one or more derivation metrics, one or more actions with respect to the first media content item and/or one or more other media content items.

21 Claims, 6 Drawing Sheets

|        | Video Quality |
|--------|---------------|
| Video A | 720p |
| Video B | 1080p |
| Video C | 480p |

FIG. 3A

|        | Number of Shares/Views |
|--------|------------------------|
| Video A | 22,503 |
| Video B | 158,216 |
| Video C | 6,794 |

FIG. 3B

|        | Upload Date |
|--------|-------------|
| Video A | June 1, 2012 |
| Video B | April 1, 2012 |
| Video C | Sep. 1, 2012 |

FIG. 3C

DETERMINING A LIKELIHOOD AND DEGREE OF DERIVATION AMONG MEDIA CONTENT ITEMS

TECHNICAL FIELD

Aspects and implementations of the present disclosure relate to data processing, and more specifically, to determining a likelihood and degree of derivation among media content items.

BACKGROUND

Audio and video content can be stored on data servers and provided to users for listening/viewing over the Internet. Applications for supporting the listening/viewing of such audio and video content may be browser-based, or may run independently of a browser.

SUMMARY

The following presents a simplified summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a simplified form as a prelude to the more detailed description that is presented later.

In an aspect of the present disclosure, a processing device processes a first media content item in relation to one or more other media content items to identify one or more similarities between the first media content item and at least one of the one or more other media content items. The processing device determines, based on an identification of the one or more similarities between the first media content item and the at least one of the one or more other media content items, one or more derivation metrics with respect to the first media content item and the at least one of the one or more other media content items. The processing device initiates, based on a determination of the one or more derivation metrics, one or more actions with respect to at least one of (a) the first media content item or (b) the at least one of the one or more other media content items.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

FIG. 3A depicts an exemplary scenario in which several media content items have been identified as being similar to and/or matching one another and also depicts their respective quality metrics, in accordance with one implementation of the present disclosure.

FIG. 3B depicts an exemplary scenario in which several media content items have been identified as being similar to and/or matching one another and also depicts their respective content dissemination metrics, in accordance with one implementation of the present disclosure.

FIG. 3C depicts an exemplary scenario in which several media content items have been identified as being similar to and/or matching one another and also depicts the respective dates on which each was uploaded, in accordance with one implementation of the present disclosure.

DETAILED DESCRIPTION

Aspects and implementations of the present disclosure are directed to determining a likelihood and degree of derivation among media content items. The systems and methods disclosed can be applied to media content such as audio and/or video content, images, and/or any other content that can be collected and/or disseminated such as via a media sharing service or website. More particularly, while a considerable amount of the media content contained within a media store or repository (such as one or more servers containing videos that are available for viewing) can be termed 'original' (in that the media content was created by the first author/creator), some of the media content contained in such media stores/repositories may actually be derived from such 'original' works (e.g., by reproducing at least some content of one or more original media items in a derived media item). While various technologies have been developed to aid in the identification of similarities and/or matches that are present between two (or more) media content items (e.g., videos stored by a media sharing service), the mere identification of a similarity or match between such items does not necessarily provide insight or indication with respect to which of the items is 'original' (that is, was created first) and which of the other items may have been derived from it (that is, was subsequently created).

Accordingly, described herein in various embodiments are technologies that enable the determination of the likelihood that a media content item may have been derived from one or more other similar/matching media content items. Such determinations can be computed, for example, based on comparisons of various respective factors associated with such media content items, such as their relative quality (e.g., their video resolution), the degree to which they have been disseminated (e.g., shared and/or viewed), and/or the date on which they were created/uploaded. These (and/or other) factors can provide various indications as to which media content item is relatively more likely to be 'original' and which media content item is relatively more likely to have been 'derived.' Moreover, based on such determinations, one or more actions can be initiated, such as with respect to media content items determined to be likely to be 'derived.'

Figure 1:
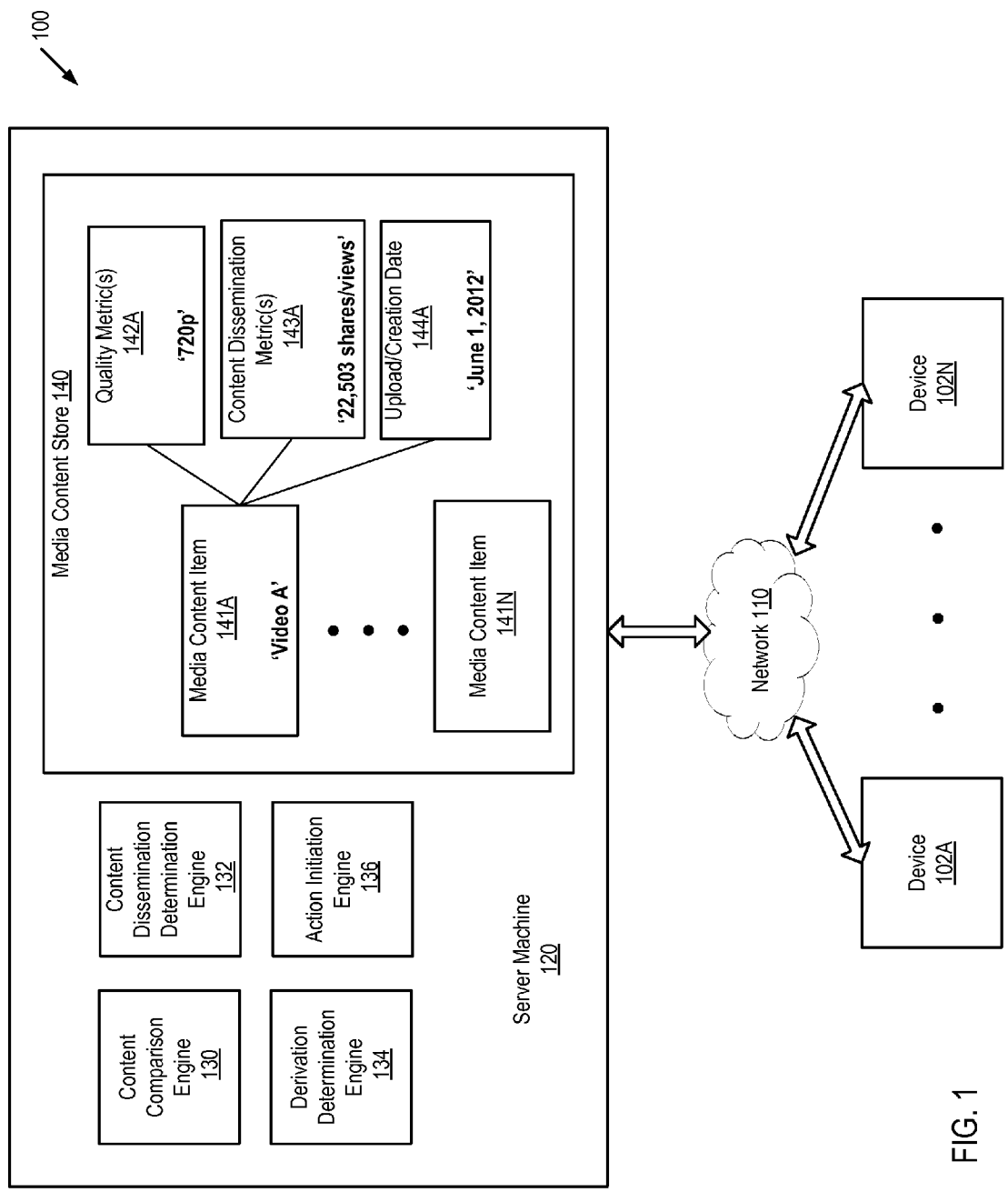
FIG. 1 depicts an illustrative system architecture, in accordance with one implementation of the present disclosure.

FIG. 1 depicts an illustrative system architecture 100, in accordance with one implementation of the present disclosure. The system architecture 100 includes user devices 102A-102N and server machine 120. These various elements or components can be connected to one another via network 110, which can be a public network (e.g., the Internet), a private network (e.g., a local area network (LAN) or wide area network (WAN)), or a combination thereof.

User devices 102A-102N can be wireless terminals (e.g., smartphones, etc.), personal computers (PC), laptops, tablet computers, or any other computing or communication devices. The user devices 102A-102N may run an operating system (OS) that manages hardware and software of the user devices 102A-102N. Various applications, such as mobile applications ('apps'), web browsers, etc. (not shown) may run on the client machines (e.g., on the OS of the client machines). Such applications can, for example, enable a user to capture media content (e.g., an audio clip, a video clip, etc.), provide media content (e.g., upload media content to a central server and/or transmit it to another user), receive media content (e.g., via network 110), and/or view, display, or otherwise present media content (e.g., playing a video, listening to a song, etc.), such as via the user device 102. The user devices 102A-102N can be geographically distributed anywhere throughout the world.

Server machine 120 can be a rackmount server, a router computer, a personal computer, a portable digital assistant, a mobile phone, a laptop computer, a tablet computer, a camera, a video camera, a netbook, a desktop computer, a media center, any combination of the above, or any other such computing device capable of implementing the various features described herein. Server machine 120 can include components such as content comparison engine 130, content dissemination determination engine 132, derivation determination engine 134, action initiation engine 136, and media content store 140. The components can be combined together or separated in further components, according to a particular implementation. It should be noted that in some implementations, various components of server machine 120 may run on separate machines. Moreover, some operations of certain of the components are described in more detail below with respect to FIG. 2.

Media content store 140 can be hosted by one or more storage devices, such as main memory, magnetic or optical storage based disks, tapes or hard drives, NAS, SAN, and so forth. In some implementations, media content store 140 can be a network-attached file server, while in other implementations media content store 140 can be some other type of persistent storage such as an object-oriented database, a relational database, and so forth, that may be hosted by the server machine 120 or one or more different machines coupled to the server machine 120 via the network 110, while in yet other implementations media content store 140 may be a database that is hosted by another entity and made accessible to server machine 120.

Media content store 140 can include media content items 141A-141N. In certain implementations, media content items 141A-141N can correspond to media content itself (e.g., audio clips, video clips, images, etc.) and/or fingerprints of such media content (e.g., quantitative data derived from features such as color, intensity, frequency, etc.), as well as data structures to associate the media content items with their respective fingerprints (e.g., a table in which each row stores an identifier of an audio/video segment and fingerprint data for that audio/video segment, etc.). Upon receiving a media content item, as can be captured, for example, at a user device 102 and transmitted to server machine 120, the received media content item can be compared to and/or otherwise analyzed in light of the media content items in the media content store 140. In doing so one or more matches and/or similarities between the captured/received media content item and those media content items stored in media content store 140 can be identified.

In certain implementations, various media content items 141 can be associated with one or more quality metric(s) 142. Such quality metrics can reflect the quality and/or other aspects of the particular media content item (e.g., video resolution, audio bitrate, compression, file format etc.). In certain implementations, the referenced quality metrics can be stored as and/or determined based on metadata associated with the various media content items.

Moreover, in certain implementations, various media content items 141 can be associated with one or more content dissemination metric(s) 143. Such content dissemination metrics can reflect the quantity and/or degree to which a particular media content item has been disseminated, viewed, etc. Examples of content dissemination metrics include, but are not limited to, instances of sharing of the media content item (e.g., the number of times that a video has been shared between one or more users such as through a social networking site or platform, and/or the details of such instances) and/or instances of the viewing or playing of the media content item (e.g., the number of times that a video has been viewed/played, such as via a media sharing service or site, and/or the details of such instances), though it should be understood that any number of other content dissemination metrics (including aggregate metrics which account for multiple individual metrics) can also be employed. In certain implementations, the referenced content dissemination metrics can be stored as and/or determined based on metadata associated with the various media content items.

It should be noted that in situations in which the systems discussed herein collect personal information about users, or may make use of personal information, the users may be provided with an opportunity to control whether programs or features collect user information (e.g., information about a user's media viewing history, interests, a user's preferences, or a user's current location), or to control whether and/or how to receive content that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Additionally, in certain implementations, various media content items 141 can be associated with one or more dates(s) (or timestamps) 144. Such dates metrics can reflect a calendar date, time, etc., with respect to which a particular media content item was created, edited, uploaded, etc. (e.g., to media content store 140). In certain implementations, the referenced dates can be stored as and/or determined based on metadata associated with the various media content items.

As described herein, one or more of the media content items 141 themselves, as well as various associated aspects of the media content items (e.g., quality metrics 142, content dissemination metrics 143, and/or upload/creation date 144) can be processed, analyzed, and/or compared with one another. In certain implementations, such operations can be performed by and/or in conjunction with content comparison engine 130 and/or content dissemination determination engine 132. In doing so, various derivation metrics can be computed, such as by and/or in conjunction with derivation determination engine 134. Such derivation metrics can indicate, for example, whether one (or more) of the media content items is likely to have been derived from one or more others. Based on such derivation metrics, various actions can be initiated, such as by and/or in conjunction with action initiation engine 136, as described herein.

Figure 2:
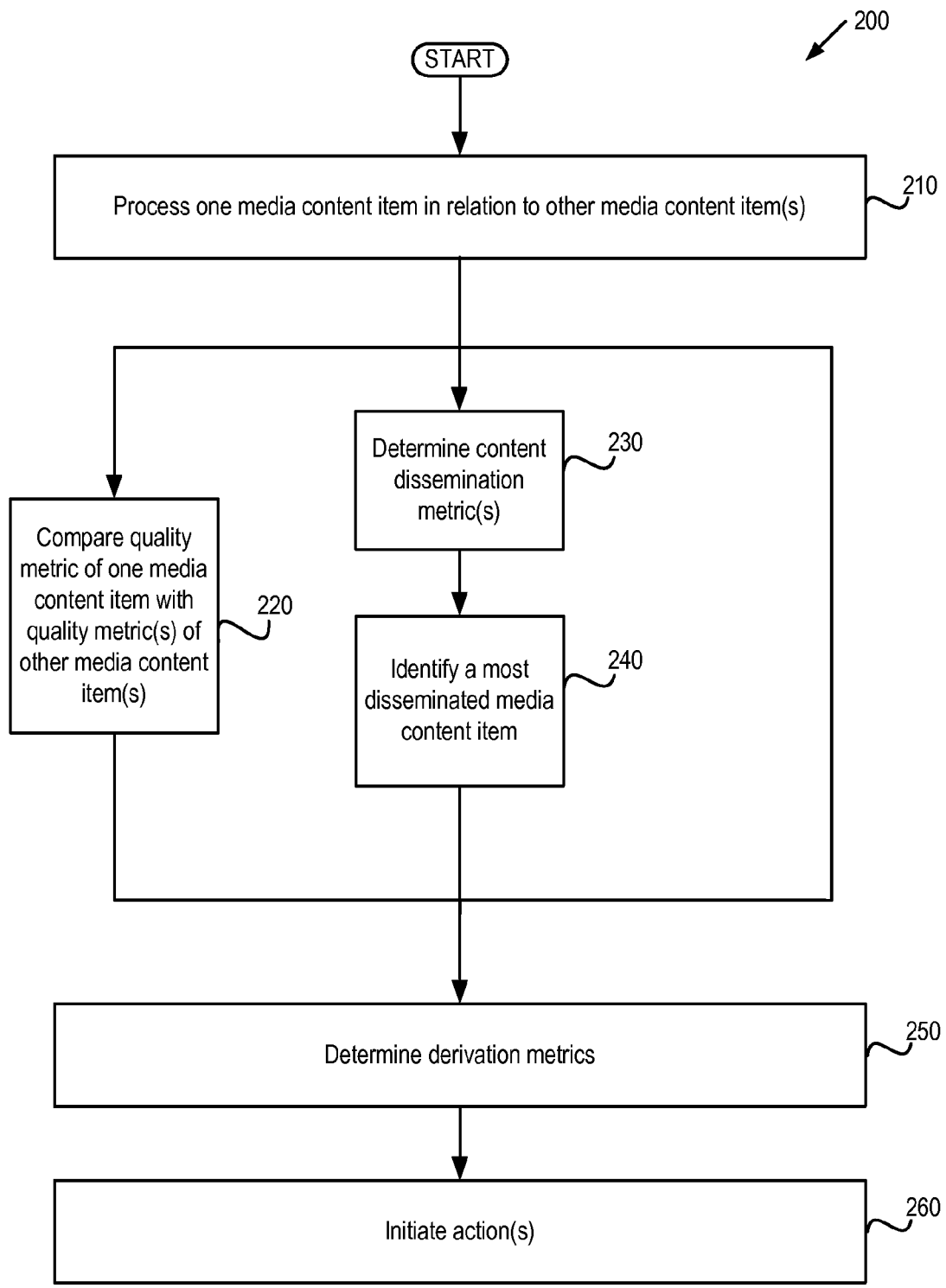
FIG. 2 depicts a flow diagram of aspects of a method for determining a likelihood and degree of derivation among media content items.

FIG. 2 depicts a flow diagram of aspects of a method 200 for determining a likelihood and degree of derivation among media content items. The method is performed by processing logic that may comprise hardware (circuitry, dedicated logic, etc.), software (such as is run on a general purpose computer system or a dedicated machine), or a combination of both. In one implementation, the method is performed by server machine 120 of FIG. 1, while in some other implementations, one or more blocks of FIG. 2 may be performed by another machine. For example, in various alternative implementations, the method can be performed at a user device 102 (i.e., the method or various aspects thereof can be performed locally at the device 102 rather than in communication with a server such as server machine 120).

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

At block 210 a first media content item can be processed in relation to one or more other media content items. In doing so, one or more similarities between the first media content item and at least one of the one or more other media content items can be identified. For example, a particular media content item (e.g., a video clip) can be compared to and/or otherwise analyzed in light of other media content items, such as those in media content store 140. In doing so, similarities and/or matches can be identified between the media content item and other media content items stored in media content store 140 (e.g., by comparing the content fingerprints of the respective media content items with one another). In one aspect, block 210 is performed by content comparison engine 130.

In certain implementations, the referenced processing can occur or be performed at any time or interval. For example, in some implementations the processing can be performed subsequent to and/or in response to a submission of a media content item, such as to media content store 140. In such an example, a particular media content item can be processed in relation to other media content items contained in the media content store 140. In other implementations, the processing can be performed periodically at one or more intervals (e.g., on a daily, weekly, monthly, etc., basis), whereby respective media content items in the media content store 140 can be processed in relation to one another.

Moreover, in certain implementations, a particular media content item can be processed in relation to one or more other media content items to identify one or more similarities and/or matches between a segment of the particular media content item and one or more segments of various other media content items. For example, with respect to a 35 minute video clip, a 10 minute segment of that clip can be identified as being similar to and/or matching a segment of and/or the entirety of one or more other media content items.

Additionally, while in certain implementations a particular media content item can be processed in relation to all of the other media content items stored in media content store 140, in other implementations a particular media content item can be processed in relation to one or more subsets thereof. For example, in certain implementations a particular media content item can be processed in relation to media content items having at least a minimum number of views. By way of further example, in certain implementations a particular media content item can be processed in relation to media content items that can be determined to be 'trending' or 'popular' (such as based on the number of views over a particular, e.g., recent, time interval). By way of yet further example, in certain implementations a particular media content item can be processed in relation to media content items that can be determined to have originated from one or more particular content creators/providers, and/or that can be determined to have one or more similarities to the particular content item (such as a similar and/or related title, description, categorization, tags, etc.). In doing so, various processing efficiencies can be realized by limiting the processing of a particular media content item specifically to those other media content items from which it is relatively more likely to have been derived (e.g., as defined by items' popularity).

At block 220, a quality metric of the first media content item can be compared with one or more quality metrics of one or more other media content items. In doing so, a relative quality of the first media content item and/or one or more other media content items can be determined. That is, having identified (such as at block 210) that a particular media content item (e.g., a video clip) is similar to and/or matches one or more other media content items, various quality metrics 142 of the respective media content items (e.g., the resolution of the respective videos, the bitrate of the respective videos, etc.) can be compared with one another. Based on such a comparison, one or more determinations can be made with respect to the quality of the various media content items in relation to one another (e.g., determining which of the various media content items has the highest relative quality, which of the media content items has the lowest relative quality, etc.). Being that, in many scenarios various types of quality degradation can occur when one media content item is derived from another, when a similarity/match is identified between two (or more) media content items, the media content item that is of relatively lower quality is relatively more likely to have been derived from the media content item that is of relatively higher quality. In one aspect, block 220 is performed by content comparison engine 130.

By way of example, FIG. 3A depicts several media content items that have been identified as being similar to and/or matching one another ('Video A,' 'Video B,' and 'Video C') and their respective quality metrics (here, corresponding to the respective resolutions of the videos, e.g., '720p,' '1080p,' etc.). It can be appreciated that by comparing the respective quality metrics of the various media content items, the relative quality of each media content item in relation to the other media content items can be determined. For example, 'Video A' (having a resolution of '720p') can be determined to have a higher relative quality than 'Video C' (having a resolution of '480p') and a lower relative quality than 'Video B' (having a resolution of '1080p').

At block 230, one or more content dissemination metrics can be determined. In certain implementations, respective content dissemination metrics can be determined for the first media content item and for one or more other media content items. That is, having identified (such as at block 210) that a particular media content item (e.g., a video clip) is similar to and/or matches one or more other media content items, various dissemination metrics 143 of the respective media content items can be compared with one another. Examples of such content dissemination metrics include, but are not limited to, instances of sharing of the media content item (e.g., between one or more users such as through a social networking site or platform) and/or instances of the viewing or playing of the media content item (e.g., via a media sharing service or site), though it should be understood that any number of other content dissemination metrics (including aggregate metrics which account for multiple individual metrics) can also be employed. For example, FIG. 3B depicts several media content items that have been identified as being similar to and/or matching one another ('Video A,' 'Video B,' and 'Video C') and their respective content dissemination metrics (here, corresponding to the respective number of instances that each videos was shared/viewed e.g., '22,503,' '158,216,' etc.). In one aspect, block 230 is performed by content dissemination determination engine 132.

At block 240, a most disseminated media content item from among the first media content item and the one or more other media content items can be identified. In certain implementations, the referenced most disseminated media content item can be identified based on one or more content disseminations metrics (such as those determined at block 230). Being that, in many scenarios an 'original' media content item is likely to be disseminated relatively more than a 'derived' media content item, when a similarity/match is identified between two (or more) media content items, the media content item that is of relatively less disseminated (e.g., was viewed less) is relatively more likely to have been derived from the media content item that is of relatively more disseminated. For example and with reference to FIG. 3B, it can be appreciated that 'Video B' (having a relatively greater content dissemination metric, i.e., 158,216 shares/views, than 'Video A' and 'Video C.' In one aspect, block 240 is performed by content dissemination determination engine 132.

At block 250, one or more derivation metrics can be determined. In certain implementations, such derivation metrics can be determined with respect to the first media content item and one or more other media content items. Such derivation metrics can include one or more score(s), ranking(s), grade(s), etc. that can reflect, for example, an absolute and/or relative degree and/or likelihood that one media content item has been derived from another (as can occur, for example, when portions or segments from one media content item are reproduced in another media content item). In certain implementations, such derivation metrics can be determined based on an identification of the one or more similarities between the first media content item and the at least one of the one or more other media content items. That is, having identified that a particular media content item (e.g., a video) is similar to and/or matches one or more other media content items (such as in the manner described at block 210), one or more derivation metrics can be determined, reflecting the degree/likelihood that one (or more) of the media content items was derived from one (or more) of the others. In one aspect, block 250 is performed by derivation determination engine 134.

In certain implementations, a chronological precedence can be determined with respect to the first media content item and the at least one of the one or more other media content items. That is, it can be appreciated that, in many scenarios, a media content item that is similar to/matches another media content item and can also be identified as having been created and/or provided (e.g., uploaded to a central media content store) subsequent to the other media content item can be determined to be at least somewhat likely to have been derived from the earlier created/uploaded media content item. Accordingly, the respective chronological precedence of a particular media content item (e.g., whether it was created and/or uploaded before or after another similar/matching media content item) can be utilized (e.g., as one or more factors) in determining the referenced derivation metrics.

For example, FIG. 3C depicts several media content items that have been identified as being similar to and/or matching one another ('Video A,' 'Video B,' and 'Video C') and the respective dates on which each video was uploaded, such as to media content store 140 (e.g., 'Jun. 1, 2012,' 'Apr. 1, 2012,' etc.). It can be appreciated with reference to FIG. 3C that, for example, with respect to 'Video A,' a chronological precedence can be determined whereby 'Video A' (uploaded on Jun. 1, 2012) was uploaded after 'Video B' (having an upload date of Apr. 1, 2012) but before 'Video C' (having an upload date of Sep. 1, 2012). Such a chronological precedence can indicate or otherwise suggest that 'Video A' is relatively more likely to have been derived from 'Video B' (on account of 'Video B' being uploaded first), but relatively less likely to have been derived from 'Video C' (on account of 'Video C' being uploaded later). Accordingly, such a determination can be considered as at least one factor in determining the referenced derivation metric(s), such as with respect to 'Video A.'

Moreover, in certain implementations the referenced derivation metrics can be determined with respect to the first media content item and one or more other media content items based on the relative quality of the first media content item and/or the one or more other media content items (such as the relative quality determined at block 220). That is, it can be appreciated that, in many scenarios, a media content item that is similar to/matches another media content item and can also be identified as being of lower relative quality than the other media content item (e.g., 720p resolution vs. 1080p) can be determined to be at least somewhat likely to have been derived from the relatively higher quality media content item. Accordingly, the respective relative quality of a particular media content item (e.g., 720p, 480p, etc., in the case of video resolution) can be utilized in determining the referenced derivation metrics. For example, as shown in FIG. 3A, it can be appreciated that 'Video A' (having a resolution of '720p') is of lower relative quality than 'Video B' (having a resolution of '1080p'), indicating that 'Video A' is relatively more likely to have been derived from 'Video B.' With respect to 'Video C' (having a resolution of '480p') being that the video is of lower relative quality than 'Video A,' it is relatively less likely that 'Video A' was derived from it. Accordingly, the respective relative quality of a particular media content item (e.g., in relation to other similar/matching media content item(s)) can be utilized (e.g., as one or more factors) in determining the referenced derivation metrics.

Additionally, in certain implementations the referenced derivation metrics can be determined based on an identification of the most disseminated media content item (such as in the manner described at block 240). That is, it can be appreciated that, in many scenarios, a media content item that is similar to/matches another media content item and can also be identified as being disseminated (e.g., shared, viewed, etc.) relatively less than the other media content item can be determined to be at least somewhat likely to have been derived from the more/most disseminated media content item.

Accordingly, the respective content dissemination metric(s) of a particular media content item (e.g., the number of instances that a video has been shared, viewed, etc.) can be utilized (e.g., as one or more factors) in determining the referenced derivation metrics. For example, as shown in FIG. 3B, it can be appreciated that 'Video A' (being shared/viewed 22,503 times) is relatively less disseminated than 'Video B' (being shared/viewed 158,216 times), indicating that 'Video A' is relatively more likely to have been derived from 'Video B.' With respect to 'Video C' (being shared/viewed 6,794 times) being that the video is less disseminated than 'Video A,' it is relatively less likely that 'Video A' was derived from it. Accordingly, the respective dissemination metric(s) of a particular media content item (e.g., in relation to other similar/matching media content item(s)) can be utilized (e.g., as one or more factors) in determining the referenced derivation metrics.

Figure 4A:
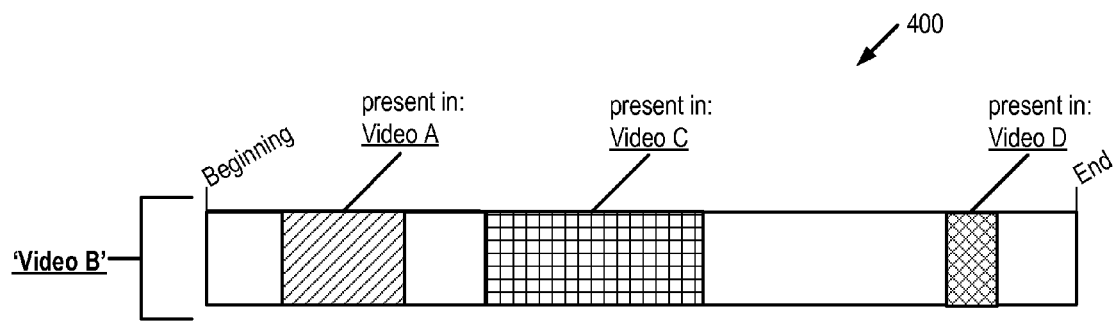
FIG. 4A depicts a schematic diagram showing a timeline of a media content item having several district segments that can be identified as being present in other media content items, in accordance with one implementation of the present disclosure.

Moreover, in certain implementations a quantity of distinct segments of the first media content item that are present in one or more other media content items can be determined. That is, it can be appreciated that, in many scenarios, a media content item having relatively many distinct segments that are also present in other media content items is less likely to have been derived than a media content item having relatively fewer (or no) distinct segments that are also present in other media content items. For example, FIG. 4A is a schematic diagram showing a timeline 400 that represents the duration of 'Video B.' It can be appreciated, with reference to FIG. 4A, that several distinct segments of 'Video B' can be identified as being present in other media content items ('Video A,' 'Video C,' etc.). Such a scenario, where relatively many distinct segments of a particular media content item can be identified as being present in other media content items, can indicate that the particular media content item (here, 'Video B') is relatively less likely to have been derived from another media content item. Accordingly, such determination(s) can be utilized (e.g., as one or more factors) in determining the referenced derivation metrics.

Figure 4B:
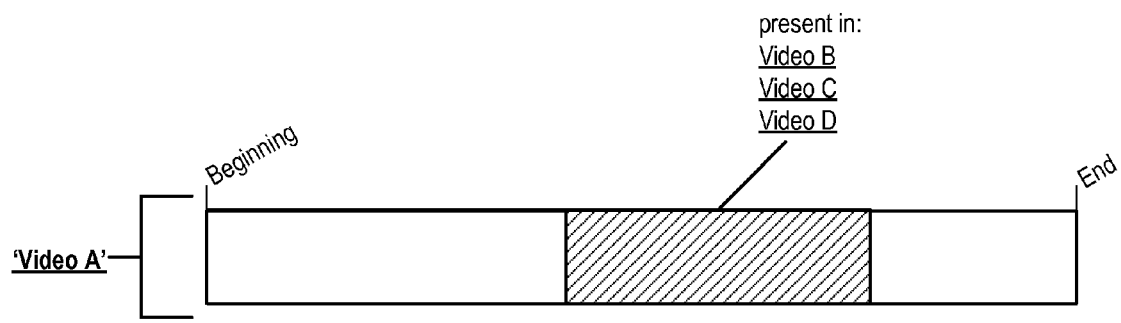
FIG. 4B depicts a schematic diagram showing a timeline of a media content item having a single district segment that can be identified as being present in other media content items, in accordance with one implementation of the present disclosure.

In contrast, FIG. 4B depicts another media content item ('Video A') having relatively fewer distinct segments that are also present in other media content items. As shown in FIG. 4B, a single distinct segment of 'Video A' is present in several other media content items ('Video C,' 'Video D,' etc.). In contrast to the scenario depicted in FIG. 4A (where the presence of many distinct segments of a particular media content item in other media content items can indicate that the particular media content item was not derived from other media content items), this scenario (i.e., where relatively few distinct segments of a particular media content item can be identified as being present in other media content items) is relatively less indicative as to whether or not the particular media content item (here, 'Video A') was or was not derived from another media content item.

At this juncture, it should be noted that while various determinations and/or factors (e.g., the chronological precedence of one media content item relative to one or more others, the relative quality of one media content item in relation to one or more others, etc.) are described herein with respect to determining the referenced derivation metrics, such determinations/factors are exemplary and any number of other determinations/factors can be similarly implemented. Moreover, the referenced derivation metrics can be determined/computed in any number of ways. For example, in certain implementations one or more determinations/factors can be aggregated into a composite score, while in other implementations such determinations/factors can be averaged, weighted, etc. In doing so, those media content items (from among many media content items such as those stored in media content store 140) that are relatively more likely to have been derived from other media content items (by virtue of their respective derivation metrics) and/or those media content items that are relatively less likely to have been derived can be identified.

Figure 5:
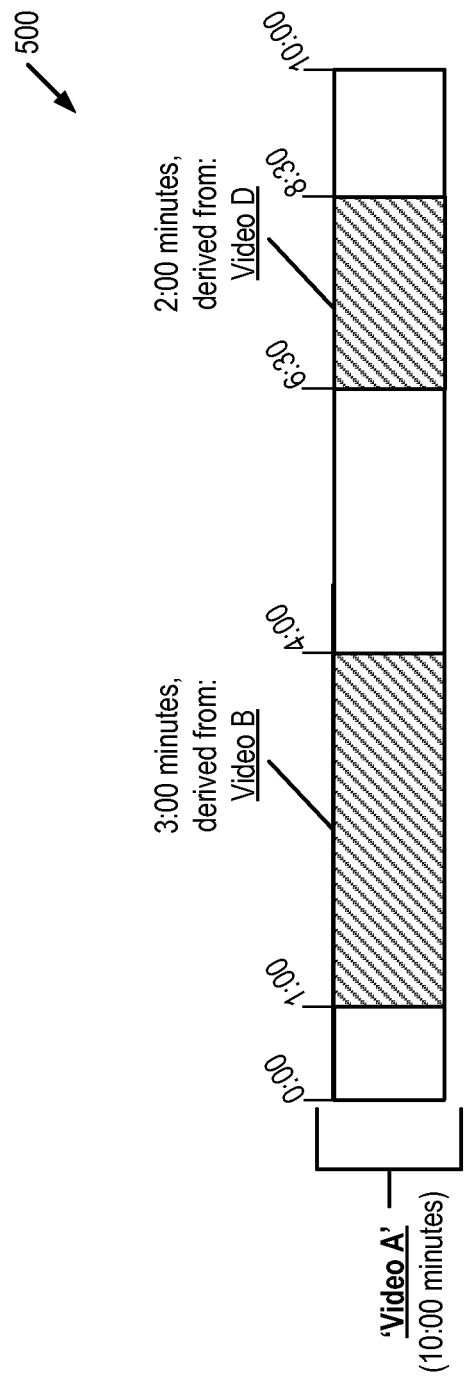
FIG. 5 depicts a schematic diagram showing a timeline of the duration of a media content item having several segments that can be identified as being derived from other media content items.

Additionally, in certain implementations a proportion of the first media content item that is derived from one or more other media content items can be determined. For example, FIG. 5 is a schematic diagram showing a timeline 500 that represents the duration of 'Video A.' It can be appreciated, with reference to FIG. 5, that several segments of 'Video A' can be identified as being present in other media content items (e.g., 'Video B' and 'Video D'). Accordingly, in certain implementations the cumulative or aggregate amount of time of a particular media content item (e.g., 'Video A' as shown in FIG. 5) that can be determined to have been derived from one or more other media content items (e.g., 'Video B,' 'Video D,' etc., as determined, for example, based on one or more derivation metrics as described herein) can be compared with the total duration of the particular media content item. In doing so, a proportion of the particular media content item that is derived from one or more other media content items can be determined. By way of illustration and with reference to FIG. 5, being that 'Video A' has a total duration of 10:00 minutes, of which 5:00 minutes can be determined to have been derived from other media content items (3:00 minutes from 'Video B' and 2:00 minutes from 'Video D'), the proportion of the total duration of 'Video A' that is derived from other media content items can be determined to be 50%.

At block 260, one or more actions can be initiated with respect to the first media content item and/or the at least one of the one or more other media content items. In certain implementations, such actions can be initiated based on a determination of the one or more derivation metrics. That is, having determined one or more derivation metrics with respect to a particular media content item (such as in the manner described at block 250), various actions can be initiated on account of such a determination. For example, in certain implementations media content items having derivation metrics that meet or exceed a particular threshold can be flagged or otherwise selected for further review and/or investigation. In one aspect, block 260 is performed by action initiation engine 136.

Moreover, in certain implementations, one or more actions can be initiated with respect to the first media content item based on a proportion of the first media content item that is derived from the at least one of the one or more other media content items (such as the proportion that can be determined at block 250). For example, in certain implementations a proportional threshold can be defined whereby a media content item of which at least that proportion can be determined to be derived from one or more other media content items can be flagged or otherwise selected for further review and/or investigation.

Additionally, in certain implementations the 'virality' of a particular media content item (i.e., the degree to which increased interest/attention is being exhibited towards such a media content item) can be computed based on the referenced derivation metrics. That is, being that media content items that are/have become/are likely to become 'viral' are relatively more likely to have other 'derived' media content items created based on them (e.g., 'mash-ups,' 'remixes,' and/or commentaries that are based on the 'original' media content item), by determining one or more of the referenced derivation metrics, a measure of the 'virality' of a particular media content item (whether past, current, or projected 'virality')

can be computed. For example, in a scenario where multiple media content items are determined to have relatively high derivation metrics with respect to a particular media content item, such a media content item can be determined to be likely to be 'viral' (or likely to have been 'viral,' or likely to become 'viral').

Moreover, in certain implementations, one or more of the referenced derivation metrics can be utilized with respect to identifying media content items that may have been inappropriately designated as being 'original.' That is, it can be appreciated that in various settings, such as in relation to media sharing sites and services, various technologies can enable content creators to submit copies of their original works which can be used as a 'references' with respect to later-submitted media content items (such as in order to identify submitted media content items that contain comparable content to that present in the 'reference' media content items). Accordingly, it can be further appreciated that, in certain scenarios, a media content item may be submitted as such a 'reference' despite actually being 'derived' from one or more other media content items and thus not 'original.' As such, in certain implementations the referenced derivation metrics can be utilized with respect to such media content items submitted as 'reference' items, in order to 'flag' or otherwise identify those media content items that, by virtue of having one or more relatively high derivation metrics (for example) may not actually be 'original' content. It should be understood that the referenced determinations/identifications are exemplary and that any number of other determinations/identifications (such as in different contents and circumstances) can be similarly implemented.

Figure 6:
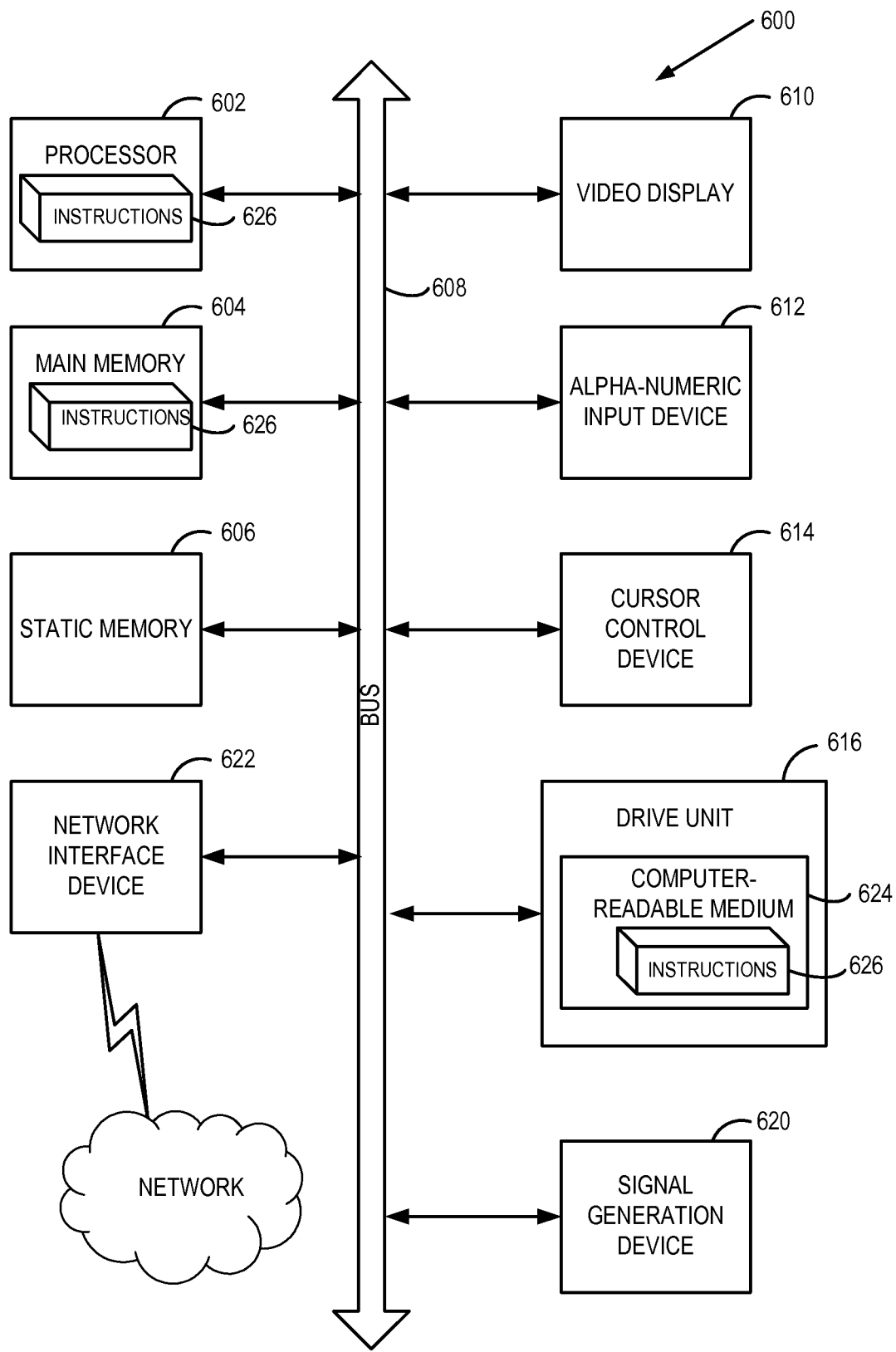
FIG. 6 depicts a block diagram of an illustrative computer system operating in accordance with aspects and implementations of the present disclosure.

FIG. 6 depicts an illustrative computer system within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing system (processor) 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a data storage device 616, which communicate with each other via a bus 608.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute instructions 626 for performing the operations and steps discussed herein.

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 616 may include a computer-readable medium 624 on which is stored one or more sets of instructions 626 (e.g., instructions executed by collaboration manager 225, etc.) embodying any one or more of the methodologies or functions described herein. Instructions 626 may also reside, completely or at least partially, within the main memory 604 and/or within the processor 602 during execution thereof by the computer system 600, the main memory 604 and the processor 602 also constituting computer-readable media. Instructions 626 may further be transmitted or received over a network via the network interface device 622.

While the computer-readable storage medium 624 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing," "determining," "initiating," "comparing," "identifying," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Aspects and implementations of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

It is to be understood that the above description is intended to be illustrative, and not restrictive. Many other embodiments will be apparent to those of skill in the art upon reading and understanding the above description. Moreover, the techniques described above could be applied to other types of data instead of, or in addition to, media clips (e.g., images, audio clips, textual documents, web pages, etc.). The scope of the disclosure should, therefore, be determined with reference to the appended claims, along with the full scope of equivalents to which such claims are entitled.

What is claimed is:

1. A method comprising:
    processing a first media content item in relation to one or more other media content items to identify one or more similarities between the first media content item and at least one of the one or more other media content items;
    based on an identification of the one or more similarities between the first media content item and the at least one of the one or more other media content items, determining, with a processing device, one or more derivation metrics with respect to the first media content item and the at least one of the one or more other media content items, wherein determining the one or more derivation metrics comprises determining a quantity of distinct segments of the first media content item that are present in the at least one of the one or more other media content items; and
    based on the quantity of distinct segments of the first media content item that are present in the at least one of the one or more other media content items, initiating one or more actions with respect to at least one of (a) the first media content item or (b) the at least one of the one or more other media content items.

2. The method of claim 1, wherein processing the first media content item in relation to one or more other media content items comprises processing the first media content item in relation to one or more other media content items to identify one or more similarities between a segment of the first media content item and one or more segments of at least one of the one or more other media content items.

3. The method of claim 1, wherein determining one or more derivation metrics comprises determining a chronological precedence with respect to the first media content item and the at least one of the one or more other media content items.

4. The method of claim 1, further comprising comparing a quality metric of the first media content item with one or more quality metrics of the at least one of the one or more other media content items to determine a relative quality of at least one of (a) the first media content item or (b) the at least one of the one or more other media content items.

5. The method of claim 4, wherein determining one or more derivation metrics comprises determining one or more derivation metrics with respect to the first media content item and the at least one of the one or more other media content items based on the relative quality of the at least one of (a) the first media content item or (b) the at least one of the one or more other media content items.

6. The method of claim 1, further comprising:
    determining, for the first media content item and for each of the one or more other media content items, one or more content dissemination metrics; and
    identifying, based on the respective one or more content disseminations metrics, a most disseminated media content item from among the first media content item and the one or more other media content items.

7. The method of claim 6, wherein determining one or more derivation metrics comprises determining one or more derivation metrics with respect to the first media content item and the at least one of the one or more other media content items based on an identification of the most disseminated media content item from among the first media content item and the one or more other media content items.

8. The method of claim 1, wherein determining one or more derivation metrics comprises determining a proportion of the first media content item that is derived from the at least one of the one or more other media content items.

9. The method of claim 8, wherein initiating one or more actions with respect to at least one of (a) the first media content item or (b) the at least one of the one or more other media content items comprises initiating, based on the proportion, one or more actions with respect to the first media content item.

10. A system comprising:
    a memory; and
    a processing device, coupled to the memory, to:
    process a first media content item in relation to one or more other media content items to identify one or more similarities between the first media content item and at least one of the one or more other media content items;
    determine, based on an identification of the one or more similarities between the first media content item and the at least one of the one or more other media content items, one or more derivation metrics with respect to the first media content item and the at least one of the one or more other media content items, wherein to determine the one or more derivation metrics the processing device is to determine a quantity of distinct segments of the first media content item that are present in the at least one of the one or more other media content items; and
    initiate, based on the quantity of distinct segments of the first media content item that are present in the at least one of the one or more other media content items, one or more actions with respect to at least one of (a) the first media content item or (b) the at least one of the one or more other media content items.

11. The system of claim 10, wherein to process the first media content item in relation to one or more other media content items is to process the first media content item in relation to one or more other media content items to identify one or more similarities between a segment of the first media content item and one or more segments of at least one of the one or more other media content items.

12. The system of claim 10, wherein to determine one or more derivation metrics is to determine a chronological precedence with respect to the first media content item and the at least one of the one or more other media content items.

13. The system of claim 10, wherein the processing device is further to compare a quality metric of the first media content item with one or more quality metrics of the at least one of the one or more other media content items to determine a relative quality of at least one of (a) the first media content item or (b) the at least one of the one or more other media content items.

14. The system of claim 13, wherein to determine one or more derivation metrics is to determine one or more derivation metrics with respect to the first media content item and the at least one of the one or more other media content items based on the relative quality of the at least one of (a) the first media content item or (b) the at least one of the one or more other media content items.

15. The system of claim 10, wherein the processing device is further to:
  determine, for the first media content item and for each of the one or more other media content items, one or more content dissemination metrics; and
  identify, based on the respective one or more content disseminations metrics, a most disseminated media content item from among the first media content item and the one or more other media content items.

16. The system of claim 15, wherein to determine one or more derivation metrics is to determine one or more derivation metrics with respect to the first media content item and the at least one of the one or more other media content items based on an identification of the most disseminated media content item from among the first media content item and the one or more other media content items.

17. The system of claim 10, wherein to determine one or more derivation metrics is to determine a proportion of the first media content item that is derived from the at least one of the one or more other media content items.

18. The system of claim 17, wherein to initiate one or more actions with respect to at least one of (a) the first media content item or (b) the at least one of the one or more other media content items is to initiate, based on the proportion, one or more actions with respect to the first media content item.

19. A computer readable medium having instructions stored thereon that, when executed by a processor, cause the processor to perform operations comprising:
  processing a first media content item in relation to one or more other media content items to identify one or more similarities between the first media content item and at least one of the one or more other media content items;
  based on an identification of the one or more similarities between the first media content item and the at least one of the one or more other media content items, determining one or more derivation metrics with respect to the first media content item and the at least one of the one or more other media content items, wherein determining the one or more derivation metrics comprises determining a quantity of distinct segments of the first media content item that are present in the at least one of the one or more other media content items; and
  based on the quantity of distinct segments of the first media content item that are present in the at least one of the one or more other media content items, initiating one or more actions with respect to at least one of (a) the first media content item or (b) the at least one of the one or more other media content items.

20. The method of claim 1, wherein initiating one or more actions comprises initiating one or more actions with respect to at least one of (a) the first media content item or (b) the at least one of the one or more other media content items based on a determination that the quantity of distinct segments of the first media content item that are present in the at least one of the one or more other media content items is greater than a quantity of distinct segments of another media content item that are present in the at least one of the one or more other media content items.

21. The system of claim 10, wherein to initiate one or more actions the processing device is further to initiate one or more actions with respect to at least one of (a) the first media content item or (b) the at least one of the one or more other media content items based on a determination that the quantity of distinct segments of the first media content item that are present in the at least one of the one or more other media content items is greater than a quantity of distinct segments of another media content item that are present in the at least one of the one or more other media content items.

* * * * *